Nov. 28, 1967   C. AMORTEGUI   3,354,580
PLANT STAKE AND CENTERING MEANS THEREFOR
Filed May 1, 1967
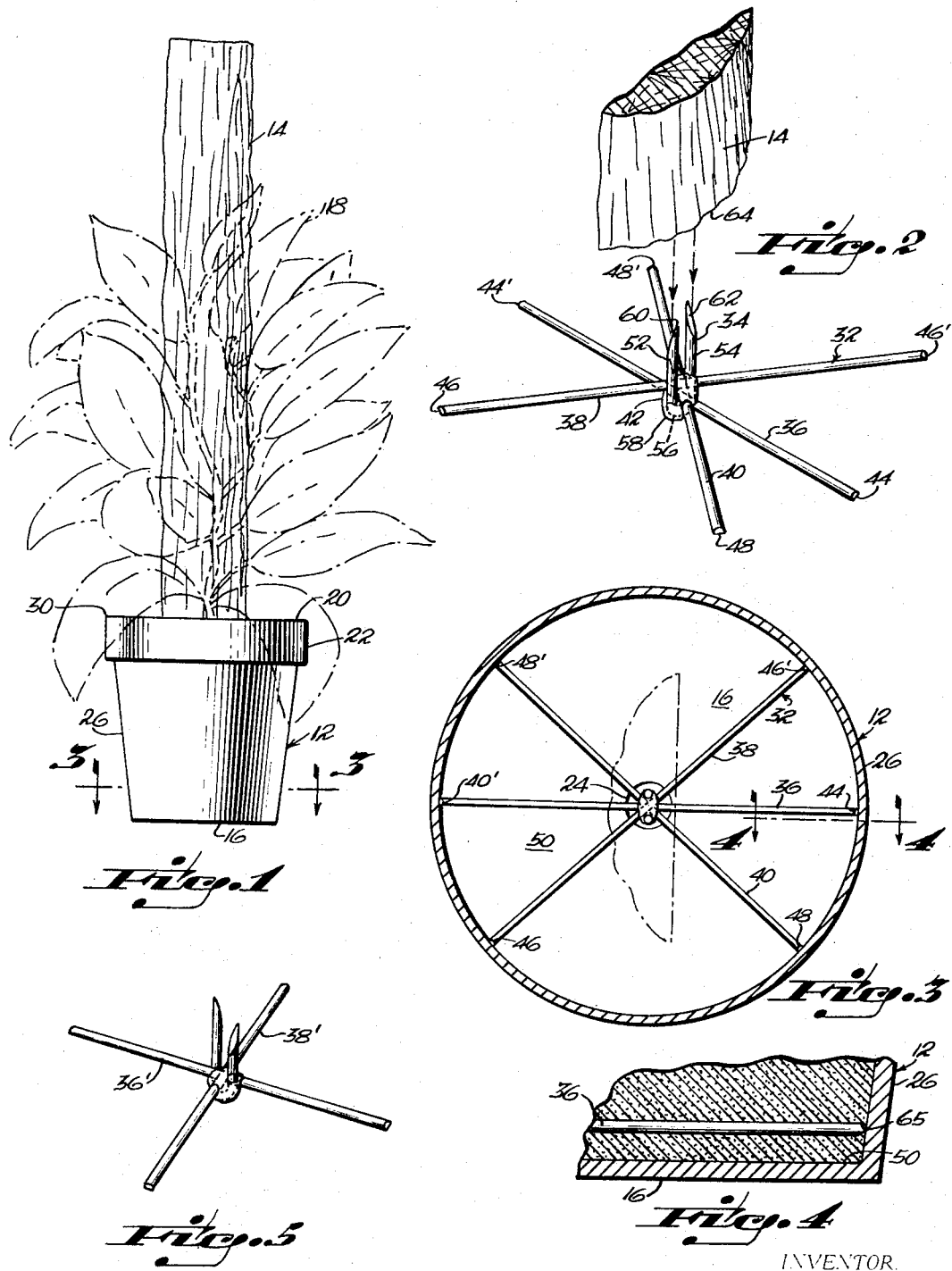
INVENTOR.
CARLOS AMORTEGUI
BY John Cyril Malloy
ATTORNEY.

United States Patent Office 3,354,580
Patented Nov. 28, 1967

3,354,580
PLANT STAKE AND CENTERING
MEANS THEREFOR
Carlos Amortegui, 1116 Wilmington St.,
Opa Locka, Fla. 33054
Filed May 1, 1967, Ser. No. 635,121
6 Claims. (Cl. 47—47)

ABSTRACT OF THE DISCLOSURE

An improved plant support for potted plants including a plant stake, an open floorwork to nest in the pot at about the base of the pot, the floorwork having sharpened ends to bite into the pot, and means to connect the stake to the floorwork in upstanding relation.

---

This invention relates to means for supporting a stake in a pot.

In the past, it has been well recognized that certain potted plants grow better if a stake is provided to support the flowers as they grow, the flowers being tied by suitable means to the stake for the support. The insertion of the stake in the potted plant is considered in the horticultural arts to be a troublesome task in that considerable skill is required for proper placement and arrangement of the support.

It is an object of this invention to provide for use with a pot an improved combination which includes an open floor to nest in generally planar relation just above the base of the pot which includes means to bite into the wall of the pot to secure the floorwork in position and, also, includes means to connect a fibrous stake, preferably of wood, in upstanding relation to the open floor so that soil material to embrace and surround the root system may be placed in the pot in the ordinary manner and without interference with the drainage or without compacting of the soil material.

It is another object of this invention to provide an improved combination for supporting plants in pots which is simple in construction, inexpensive to manufacture and which is adapted for various types of pots.

In the drawings:

FIGURE 1 is an elevation view of a pot having the improved plant support combination installed;

FIGURE 2 is a perspective view of the combination and illustrating the open floor, the lower portion of the stake and the means to connect the stake to the open floor;

FIGURE 3 is a view in cross-section taken along the plane indicated by the line 3—3 of FIGURE 1 and looking in the direction of the arrow;

FIGURE 4 is an enlarged view of that portion of FIGURE 3 taken along the line 4—4 of FIGURE 3 and looking in the direction of the arrows; and FIGURE 5 is another form of the open floorwork and means to connect to the stake shown in FIGURE 2.

Referring to the drawings, it will be seen in FIGURE 1 that a pot 12 is provided with a stake 14 in upstanding relation of the pot base 16 for supporting a plant 18 having flowers shown in dotted lines. The pot is provided with an upper open mouth 20 with a circumferential flange 22 thereabout and with the base on the interior of the pot being foreshortened with respect to the cross-sectional area of the mouth and provided with a drainage hole 24. The pot is preferably of a material such as the orange clay pot which is quite commonly encountered. Also, the pot is provided with a tapered side wall 26 which connects the base and the upper lip 30. Any suitable soil material to surround and embrace the root system may be employed, and quite often a suitable additive such as fir bark or other filler is combined with the soil. The improved plant support and its constituent elements will be best understood on reading the following description and on reference to FIGURE 2. The combination includes the plant stake 14, an open floorwork generally designated 32 and means 34 to connect the floorwork to the stake and to hold it in upstanding relation with respect to the pot. The floorwork comprises a plurality of interconnected members such as that designated by the numerals 36, 38 and 40 which extend outwardly from a central zone 42 as the floorwork is seen in plan, FIGURE 3, to terminal ends 44 and 44', 46 and 46' and 48 and 48'. The terminal ends as seen in plan define an area which is slightly enlarged with respect to the receiving area 50 of the base and substantially less than the transverse area of the mouth of the pot. The open work is, thus, nestable in a transverse attitude above the plane of the base with the terminal ends of the open work abutting and being supported by the side wall of the pot. The terminal ends of the extending members comprising the openwork floor are sharp to scrape the interior wall from a point just above the plane of nesting on application of a pressure moving the openwork floor in a transverse attitude toward the base so that the sharpened terminal ends bite into the material of the pot wall to resist removal of the combination from the pot. The means 34 to connect the open floorwork 32 to the stake 14 preferably comprises a U-shaped staple having a first leg 52 and a second leg 54 extending from a bight portion 56. The bight portion is looped under the members of the open floorwork 32 and secured thereto as by welding 58. The sharpened distal ends 60 and 62 of the staple define a plane which is adapted to pierce the confronting area 64 of the stake and to hold the stake to the openwork floor. In FIGURE 5 a slightly modified openwork floor is provided, the members being designated by the numerals 36' and 38' and being two in number interconnected at their centers. In either embodiment, the embodiment of FIGURE 2 or the embodiment of FIGURE 4, the members are of rigid, relatively strong wire material of a common length inter-connected at their midpoints. In use, it will be seen that the openwork floor is connected to the lower portion of the stake and inserted firmly into nesting relation by pushing the openwork floor toward the base until it nests securely on the scraping action and biting of the sharpened terminal ends into the material of the side wall as is indicated by the numeral 65 in FIGURE 4. Thereafter, the soil material may be inserted and, as is apparent in FIGURE 4, it will, because there is no restriction of any material degree by the openwork floor, fill the pot uniformly. The bight portion 56 of the staple it will be seen by depending below the openwork floor will limit the movement of the openwork floor so that in any events it will be spaced slightly above the floor and the area as seen in plan of the bight is less than the area required to block the conventional hole 24 in the pot base.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. For use in centering and supporting a plant to grow in soil material surrounding and embracing a root system in a pot having a mouth, a foreshortened base with a hole, and uniformly tapered interior side walls of friable material connecting the mouth and base, an improved plant support for pots, comprising in combination;

a plant stake of fibrous material, an open floorwork in the pot, and means connecting the stake to the floorwork in upstanding relation;

said floorwork comprising a plurality of interconnected members extending radially from a central zone as seen in plan to terminal ends defining an area slightly enlarged with respect to the area of the pot base, said floorwork being nestable as a transverse open floor at just above the plane of said base, said terminal ends being sharp to scrape the interior wall on pressure applied to the floorwork to move it toward the base to scrape the interior wall from a plane just above the plane of nesting and to bite into the interior wall to resist removal of the combination from the pot.

2. The improved combination as set forth in claim 1 wherein said connecting means include means depending from the floorwork to limit downward movement of the floorwork and space said floorwork from the base of the pot by engaging said base, said means to limit being of an area as seen in plan which is less than one of the dimensions across the hole so as to not limit drainage of the pot.

3. The improved combination as set forth in claim 1 wherein said floorwork is composed of a pair of crossed members of the same length being interconnected at their midpoints and each member having a length slightly larger than the diameter of the plane of nesting.

4. The improved combination as set forth in claim 2 wherein said floorwork is composed of a pair of crossed members of the same length being interconnected at their midpoints and each member having a length slightly larger than the diameter of the plane of nesting.

5. The improved combination as set forth in claim 3 wherein said means to connect comprises a U-shaped staple having pointed upstanding ends and with the bight of said staple looped under the midpoint of said members and secured thereto and said pointed upstanding ends being embedded in the proximal end of the fibrous plant stake.

6. As in claim 5 wherein said plant stake is of driftwood material.

References Cited

UNITED STATES PATENTS

| | | | |
|---|---|---|---|
| 1,333,480 | 3/1920 | Ferguson | 248—44 |
| 1,463,734 | 7/1923 | Ullrich | 248—44 |
| 2,893,169 | 7/1959 | Sheperd | 47—47 |
| 3,165,863 | 1/1965 | Duran | 47—47 |

ABRAHAM G. STONE, *Primary Examiner.*

ROBERT E. BAGWILL, *Examiner.*